(12) United States Patent
Scharpf et al.

(10) Patent No.: US 9,114,788 B2
(45) Date of Patent: Aug. 25, 2015

(54) MANIFOLD JOINT SEAL

(75) Inventors: Robert N. Scharpf, Greenville, SC (US); S. Clay Evatt, Greenville, SC (US)

(73) Assignee: Wabtec Holding Corp., Wilmerding, PA (US)

( * ) Notice: Subject to any disclaimer, the term of this patent is extended or adjusted under 35 U.S.C. 154(b) by 224 days.

(21) Appl. No.: 13/350,944

(22) Filed: Jan. 16, 2012

(65) Prior Publication Data

US 2012/0192957 A1 Aug. 2, 2012

Related U.S. Application Data

(60) Provisional application No. 61/436,771, filed on Jan. 27, 2011.

(51) Int. Cl.
*F15B 13/08* (2006.01)
*B60T 17/04* (2006.01)

(52) U.S. Cl.
CPC .............. *B60T 17/04* (2013.01); *F15B 13/0821* (2013.01); *Y10T 137/0402* (2015.04); *Y10T 137/6866* (2015.04)

(58) Field of Classification Search
USPC .............. 137/884, 347, 269, 271, 15.01, 594; 285/19, 20, 126.1, 192, 194
See application file for complete search history.

(56) References Cited

U.S. PATENT DOCUMENTS

| | | | | |
|---|---|---|---|---|
| 3,575,377 | A * | 4/1971 | Carlton et al. | 251/176 |
| 3,654,960 | A * | 4/1972 | Kiernan | 137/884 |
| 3,915,194 | A * | 10/1975 | Friedrich | 137/884 |
| 4,082,324 | A | 4/1978 | Obrecht | |
| 4,089,549 | A * | 5/1978 | Vyse et al. | 285/124.4 |
| 5,383,689 | A * | 1/1995 | Wolfe, Sr. | 285/124.3 |
| 6,546,960 | B1 | 4/2003 | Rohrberg | |
| 6,953,048 | B2 * | 10/2005 | Chuh | 137/269 |
| 7,562,677 | B2 * | 7/2009 | Perusek et al. | 137/884 |
| 7,942,165 | B2 * | 5/2011 | Katsura | 137/884 |
| 2001/0047835 | A1 * | 12/2001 | Fagerstrom | 137/884 |
| 2003/0111123 | A1 * | 6/2003 | Rudle | 137/884 |
| 2006/0011247 | A1 * | 1/2006 | Vu | 137/884 |
| 2010/0089465 | A1 | 4/2010 | Bordeau | |
| 2010/0186842 | A1 * | 7/2010 | Eriksson | 137/884 |

FOREIGN PATENT DOCUMENTS

| | | |
|---|---|---|
| CN | 201401507 Y | 2/2010 |
| DE | 19621261 A1 | 11/1997 |
| DE | 60120255 T2 | 4/2007 |
| DE | 102006010723 A1 | 9/2007 |

(Continued)

*Primary Examiner* — William McCalister
*Assistant Examiner* — Ian Paquette
(74) *Attorney, Agent, or Firm* — The Webb Law Firm

(57) ABSTRACT

A pneumatic manifold for a braking system of a railway vehicle includes a first manifold section and a second manifold section, each having an interior surface thereon and a plurality of ports and passageways extending therethrough, and a manifold joint seal for creating a sealing engagement between the first manifold section and the second manifold section. The manifold joint seal is removably mounted inside a slot provided on the surface of one or both manifold sections. The manifold joint seal includes a retainer body having an opening extending therethrough, and two sealing elements are disposed within respective channels provided on opposing surfaces of the retainer body in the axial direction of the annular opening.

13 Claims, 9 Drawing Sheets

(56) References Cited

FOREIGN PATENT DOCUMENTS

| | | |
|---|---|---|
| EP | 1318339 A2 | 6/2003 |
| GB | 2178139 A | 2/1987 |
| JP | 519757 U | 3/1993 |
| JP | 630578 U | 4/1994 |
| JP | 20072902 A | 1/2007 |
| KR | 1020070054422 A | 5/2007 |
| WO | 2004048784 A2 | 6/2004 |
| WO | 2006045489 A1 | 5/2006 |

* cited by examiner

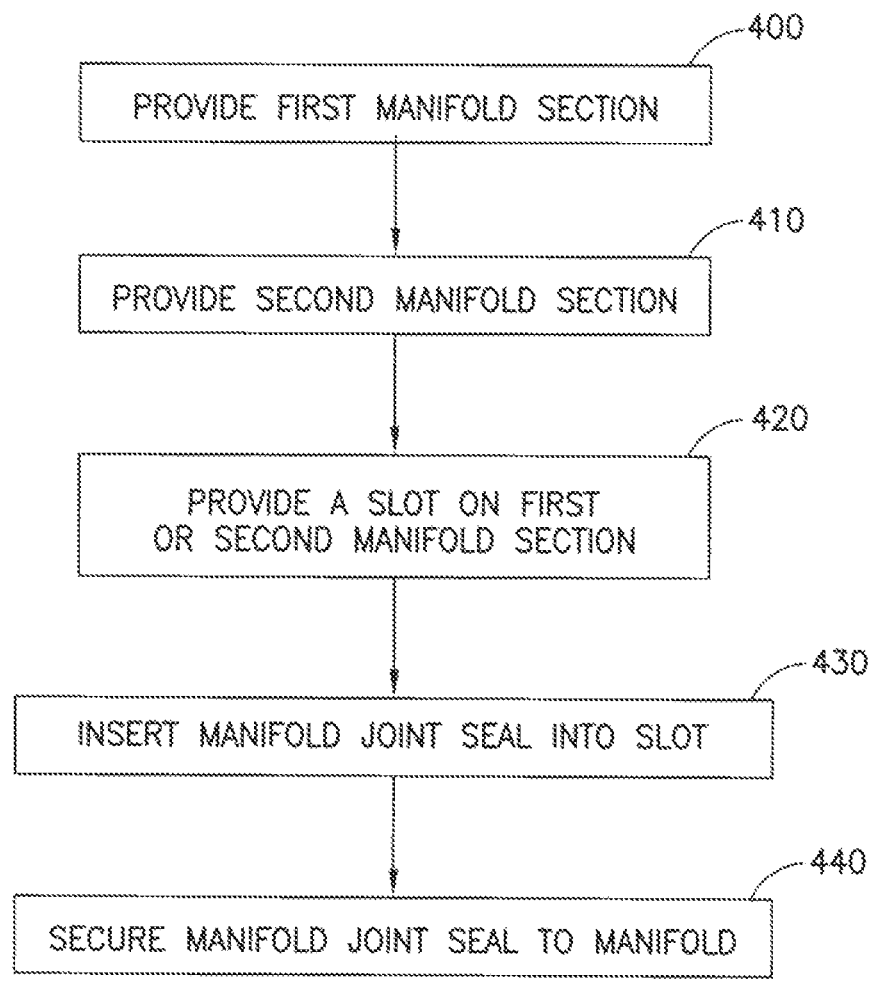

MANIFOLD JOINT SEAL

CROSS REFERENCE TO RELATED APPLICATIONS

This application claims the benefit of U.S. Provisional Patent Application Ser. No. 61/436,771 entitled "Manifold Joint Seal", filed Jan. 27, 2011, which is hereby incorporated by reference in its entirety.

BACKGROUND OF THE INVENTION

1. Field of the Invention

This invention relates, in general, to a pneumatic manifold for a braking system of a railway vehicle, and more particularly, to a joint seal operative for sealing one or more passageways of a pneumatic manifold for a railway vehicle.

2. Description of the Related Art

Most railway vehicles, such as railway cars and locomotives, are equipped with some form of a pneumatic brake system commonly referred to as air brake systems. Such systems utilize compressed air from an onboard compressor to provide braking power to the wheels of a railway vehicle. Various sizes and configurations of air brake systems may be adapted for a plurality of railway vehicles, including locomotives, freight cars, and passenger cars. Typically, air is stored in a reservoir tank in a compressed state. A plurality of brake lines delivers the compressed air to one or more pneumatic valves, which in turn regulate the air pressure of one or more brake cylinders. By increasing or reducing the pressure in the brake cylinders, brakes are disengaged or engaged, respectively.

Modern air brake systems also include a pneumatic manifold for directing the compressed air between various pneumatic components. The pneumatic manifold typically includes two or more plates having a plurality of ports and passageways provided on their respective interior surfaces. The ports and passageways on each plate are dimensioned such that they correspond to the ports and passageways on an abutting plate. The ports and passageways on the adjoining plates form pneumatic pathways for routing compressed air to various pneumatic devices. Compressed air from a pneumatic source is received inside the manifold and routed through the plurality of ports and passageways to other pneumatic circuits, couplings, and devices. Two or more manifold plates form a manifold section. A plurality of manifold sections may be connected to form a single manifold. The manifold sections are typically connected at their lateral edges.

Air-tight connection between the manifold plates and/or manifold sections is achieved using an adhesive or a gasket. A simple air seal between the adjoining manifold parts is not commonly utilized because of the increased difficulty in servicing the seal once the manifold is installed on a railway vehicle. The adhesive is intended to fill the voids between the plates and/or sections and create an air-tight connection therebetween. A plurality of alignment pins may be provided on the interior surface of one plate to engage a plurality of alignment holes provided on the interior surface of the corresponding plate. Similarly, alignment pins and holes may be provided on the adjoining manifold sections to connect the corresponding ports or passageways. The manifold plates and/or sections may be further secured by fastening means, such as bolts. A common problem with manifolds of such design is that the adhesive sometimes blocks the ports and passageways inside the manifold and thereby creates a reduction in pressure. In some instances, the adhesive may completely block one or more ports or passageways, which leads to an improper operation of the air brake system.

In order to overcome this deficiency, some manifolds include a center plate provided between the two manifold plates. The center plate increases the separation distance between the manifold plates and reduces the possibility that the adhesive used to bond the plates may block the ports and passageways of the manifold. Similarly, the center plate may be provided between the two adjoining manifold sections. The separation between the plates and/or sections increases the capacity of the manifold and usually requires increased pressure to maintain the braking efficiency.

Other manifold designs may include a jumper plate provided on top of two or more adjoining manifold plates and/or sections. The jumper plate includes one or more pneumatic passageways that correspond to the ports or passageways on the manifold. A typical jumper plate requires the compressed air to travel through a tortuous path that inevitably leads to a reduction in operating pressure within the manifold. Additionally, because the jumper plate is provided on top of the manifold, it increases the size and complexity of the manifold. The addition of the jumper plate leads to an increased cost for manufacturing and/or installing the pneumatic manifold.

SUMMARY OF THE INVENTION

In view of the foregoing, a need exists for a pneumatic manifold that eliminates the problems commonly associated with prior manifold designs and provides a manifold having air-tight connections between the ports and passageways. An additional need exists for providing a manifold that does not restrict the airflow between the ports and passageways and allows for easy routine maintenance.

As described in detail herein, a pneumatic manifold for a railway vehicle is disclosed having air-tight connection between a plurality of ports and passageways in a manner that does not restrict the airflow between the ports and passageways and allows for easy routine maintenance of the manifold. According to one embodiment, a manifold for a braking system of a railway vehicle may include a first manifold section having a first surface thereon and a plurality of fluid passageways extending therethrough, and a second manifold section having a second surface thereon and a plurality of fluid passageways extending therethrough, the first surface of the first manifold in alignment with the second surface of the second manifold, such that the plurality of fluid passageways of the first manifold section are in fluid connection with the plurality of fluid passageways of the second manifold section. A slot may be formed on at least one of the first manifold section and the second manifold section, with the slot extending through at least part of the width of at least one of the first manifold section and the second manifold section. The manifold may further include a manifold joint seal operative for creating a seal between the first surface of the first manifold section and the second surface of the second manifold section such that a substantially air-tight fluid connection is created between the fluid passageways extending between the first manifold section and the second manifold section.

The manifold joint seal may include a retaining body for inserting into the slot and may include an opening extending through the retaining body such that fluid can pass between the first manifold section and the second manifold section through the opening. The manifold joint seal may further include sealing elements abutting the first manifold section and the second manifold section such that the sealing elements create a substantially air-tight fluid connection between the fluid passageways.

The sealing elements may be at least partially contained inside respective channels provided on opposing surfaces surrounding the opening on the retaining body. At least one aperture may be provided in the retaining body for securing the manifold joint seal to the manifold. The manifold joint seal may be secured to the manifold by way of at least one fastening element engaging the aperture. The manifold joint seal may have one or more chamfered sections on the exterior surface thereof.

In another embodiment, the manifold joint seal may include a retaining body having an opening extending therethrough, at least one sealing element, and at least one channel provided, for example, on opposing surfaces surrounding the opening on the retaining body, for retaining the sealing element. The retaining body may be adapted for insertion into a slot provided on the manifold of a braking system for a railway vehicle, such that the at least one sealing element creates a substantially air-tight fluid connection between fluid passageways extending through the manifold. The channels may include a slot that narrows in an axial direction from the inside of the retainer body to the outside of the retainer body. At least one aperture may be provided in the retaining body for securing the manifold joint seal to the manifold.

An arcuate portion opposite a flat portion may be provided on the retaining body. The arcuate portion may be dimensioned to be removably received within a slot provided on the manifold, the slot being shaped to correspond to the arcuate portion. The flat portion may be aligned with an exterior surface of the manifold when the manifold joint seal is inserted inside the slot. The manifold joint seal may be secured to the manifold by way of a fixing plate.

According to another embodiment, a method of forming a manifold for a braking system of a railway vehicle may be provided and may include the steps of providing a first manifold section having a first surface thereon and a plurality of fluid passageways extending therethrough; providing a second manifold section having a second surface and a plurality of fluid passageways extending therethrough, the first surface of the first manifold being aligned with the second surface of the second manifold, such that the plurality of fluid passageways of the first manifold section are in fluid connection with the plurality of fluid passageways of the second manifold section; and providing a slot formed on at least one of the first manifold section and the second manifold section. The slot may extend through at least part of the width of at least one of the first manifold section and the second manifold section. The method may further include a step of inserting a manifold joint seal into the slot, the manifold joint seal being operative for creating a seal between the first surface of the first manifold section and the second surface of the second manifold section, such that a substantially air-tight fluid connection is created between the fluid passageways. The method may further include a step of securing the manifold joint seal to the manifold.

The manifold joint seal may include a retaining body for inserting into the slot and an opening extending through the retaining body such that air from the first manifold section travels to the second manifold section through the opening. Furthermore, the manifold joint seal may include sealing elements containing the interior surface of the first manifold section and the second manifold section, such that the sealing elements create the substantially air-tight fluid connection between the fluid passageways extending between the first manifold section and the second manifold section. The sealing elements may be at least partially contained inside respective channels provided on opposing surfaces surrounding the opening on the retaining body. The manifold joint seal may include at least one aperture in the retaining body for securing the manifold joint seal to the manifold by way of at least one fastening element engaging the aperture. The manifold joint seal may have one or more chamfered sections on the exterior surface thereof.

Further details and advantages of the present invention will become apparent from the following detailed description read in conjunction with the drawings.

BRIEF DESCRIPTION OF THE DRAWINGS

FIG. 9 is a flowchart showing of steps for installing the manifold joint seal in accordance with one exemplary embodiment.

DETAILED DESCRIPTION OF THE INVENTION

Figure 1:
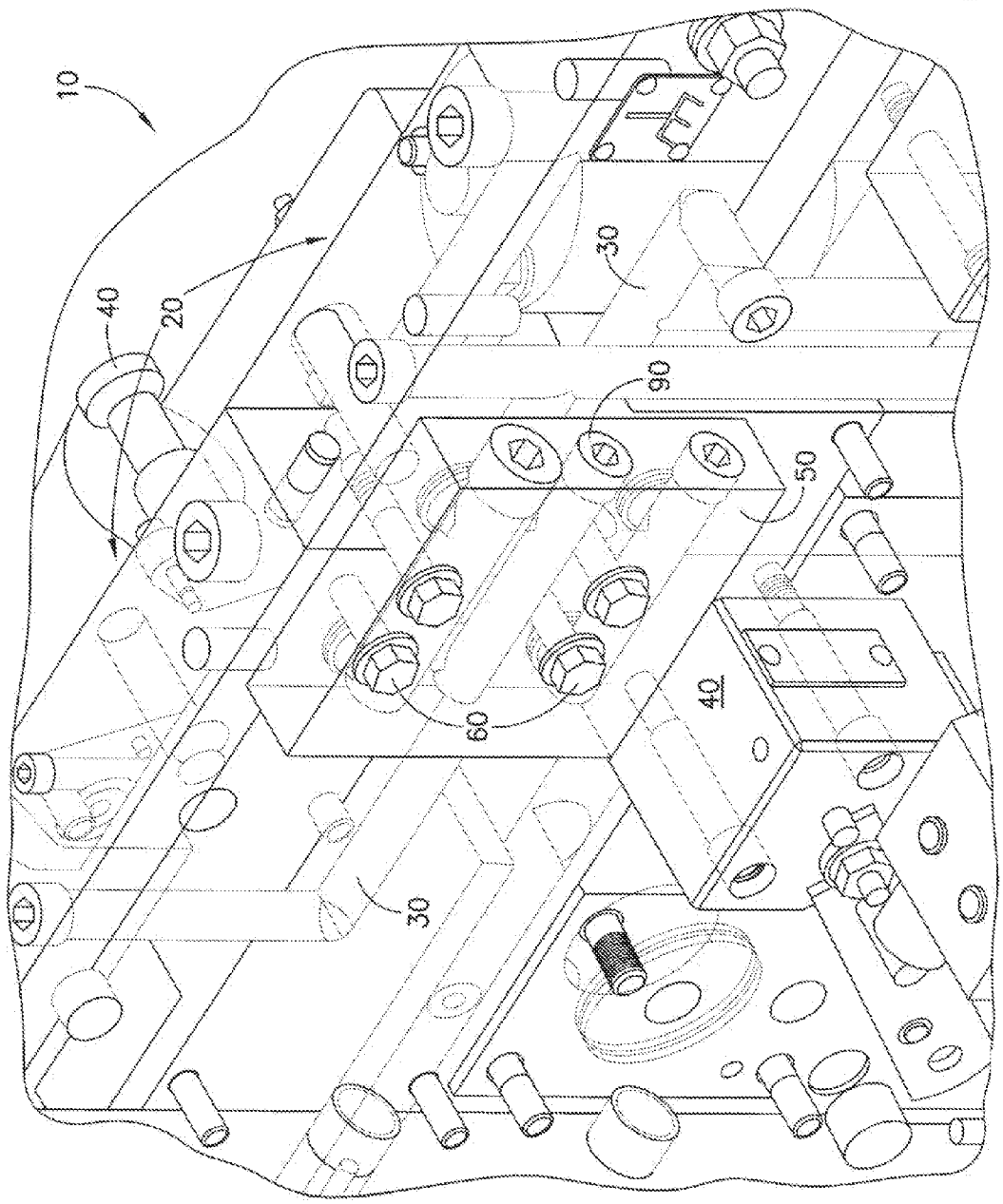
FIG. 1 is a perspective view of a prior art manifold having a jumper plate installed between adjacent manifold plates.

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Referring to the drawings in which like reference characters refer to like parts throughout the several views thereof, an embodiment of a manifold joint seal is shown and is generally described hereinafter for use in sealing one or more passageways of a pneumatic manifold for a braking system of a railway vehicle.

With reference to FIG. 1, a prior art manifold 10 includes a plurality of manifold sections 20 connected at the adjoining edges of manifold sections 20. Each manifold section 20 includes a plurality of passageways 30. A plurality of pneumatic devices 40, such as valves, solenoids, brake lines, and pneumatic couplings are adapted to be mounted on manifold 10. Passageways 30 provide fluid connection between manifold 10 and one or more pneumatic devices 40.

As further shown in FIG. 1, passageways 30 provided on each manifold section 20 are fluidly connected by a jumper plate 50. Jumper plate 50 may be secured to one or more manifold sections 20 using a plurality of fasteners, such as bolts 60. A gasket (not shown) may be provided between jumper plate 50 and each manifold section 20 to create an air-tight connection and prevent air leaks and the resulting loss in operating pressure.

Figure 2:
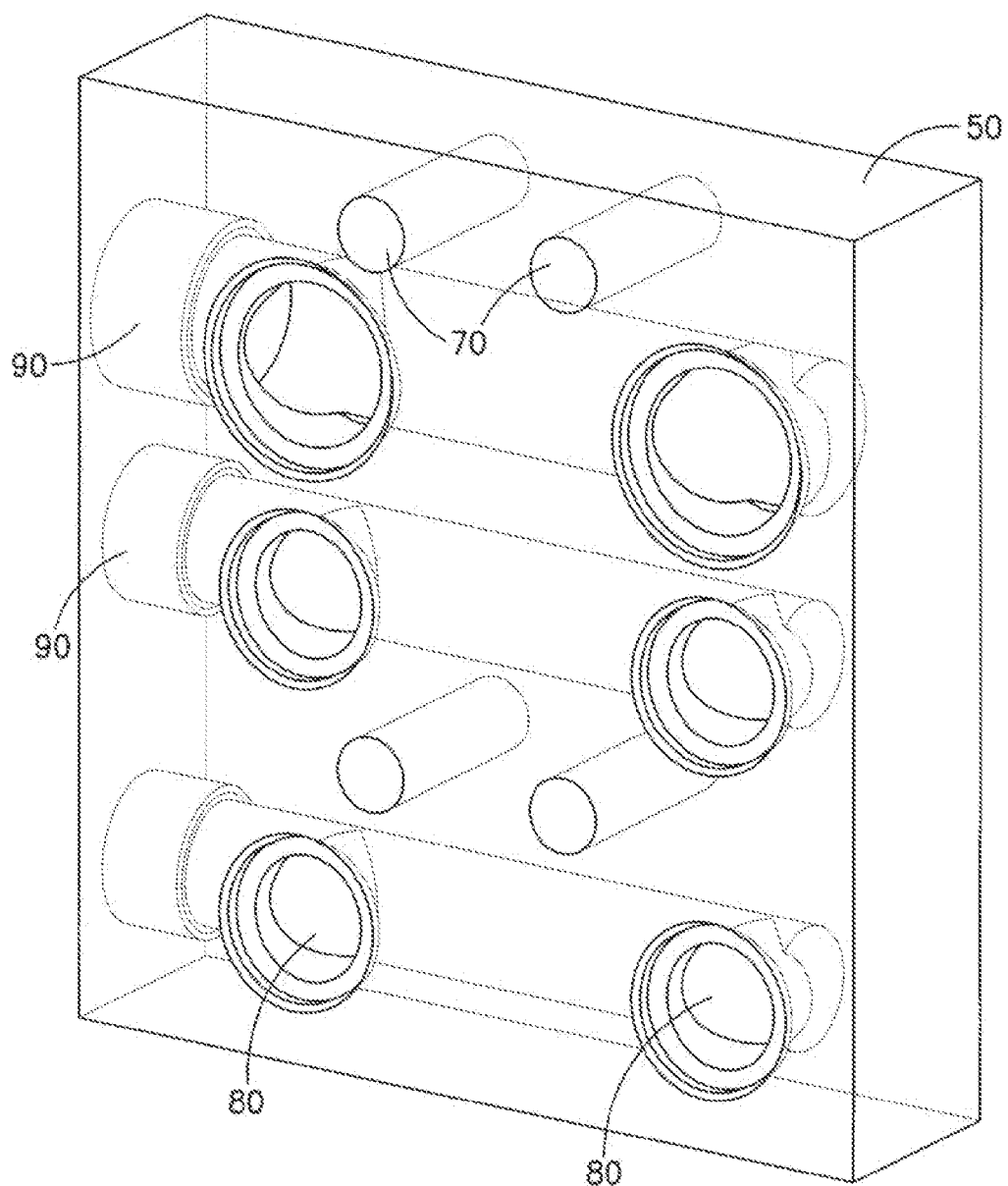
FIG. 2 is a perspective view of the jumper plate illustrated in FIG. 1.

With reference to FIG. 2 and with continuing reference to FIG. 1, jumper plate 50 includes a plurality of holes 70 through which bolts 60 are inserted to secure jumper plate 50 to one or more manifold sections 20. Each hole 70 is dimensioned such that bolt 60 may be inserted therethrough without interference. Jumper plate 50 further includes one or more air passages 80 extending at least through part of the interior of jumper plate 50. Each air passage 80 is adapted to correspond to and be in fluid communication with a respective passageway 30 provided on manifold section 20. Each air passage 80 has a tortuous path that includes two 90° shifts in the direction of air flow. In the embodiment illustrated in FIG. 2, each air passage 80 is desirably provided by machining a hole in the interior of jumper plate 50. One end of each air passage 80 that extends through the side of jumper plate 50 may be sealed by a plug 90. Plug 90 may be removably inserted into air passage 80.

The prior art manifold 10 shown in FIG. 1 has several disadvantages. Each air passage 80 of jumper plate 50 features a tortuous fluid path that restricts air flow and causes a reduction in air pressure inside manifold 10. Furthermore, jumper plate 50 must be installed on the outside surface of manifold sections 20, thereby increasing the size of manifold 10.

Figure 3:
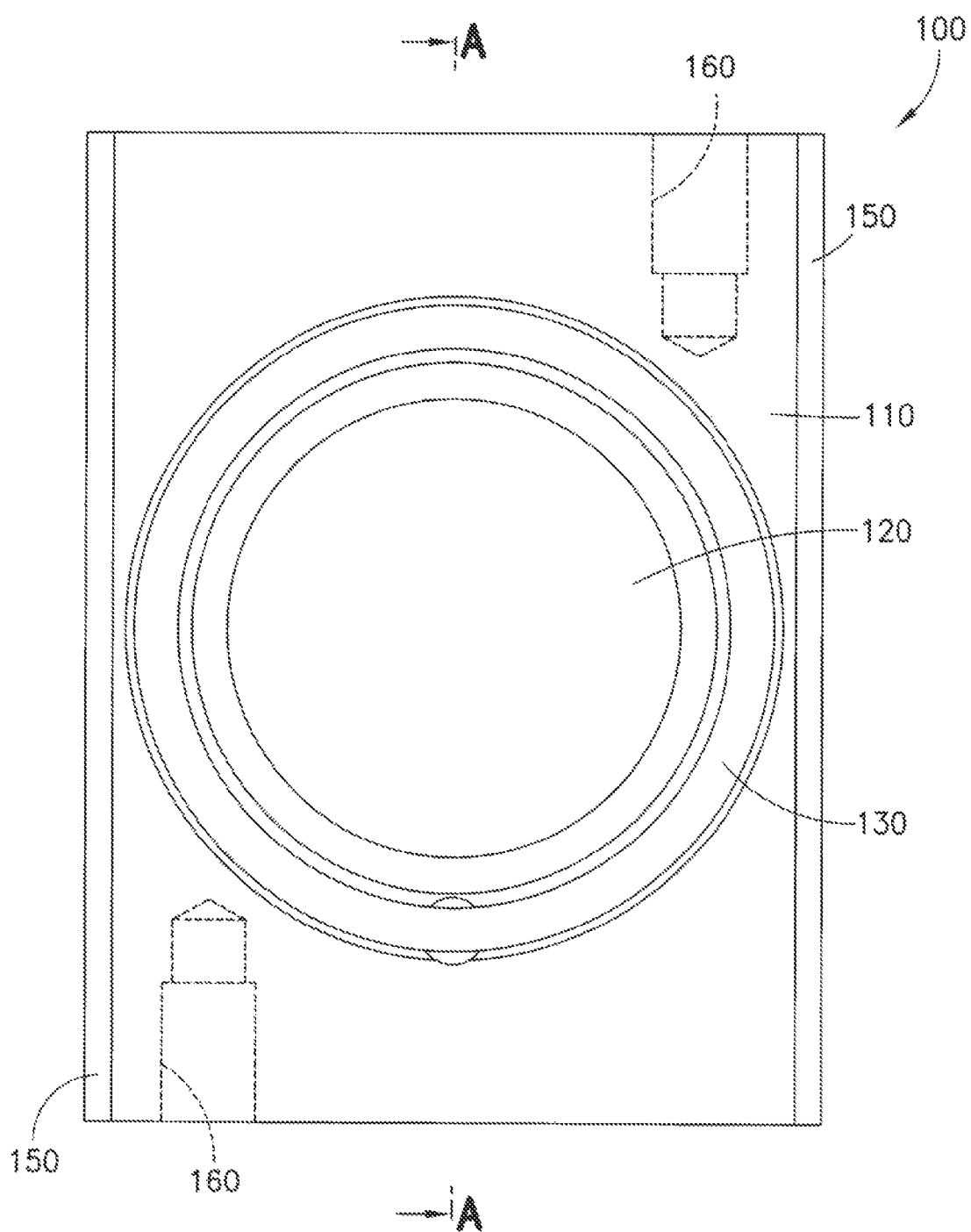
FIG. 3 is a front view of an embodiment of a manifold joint seal.
Figure 4:
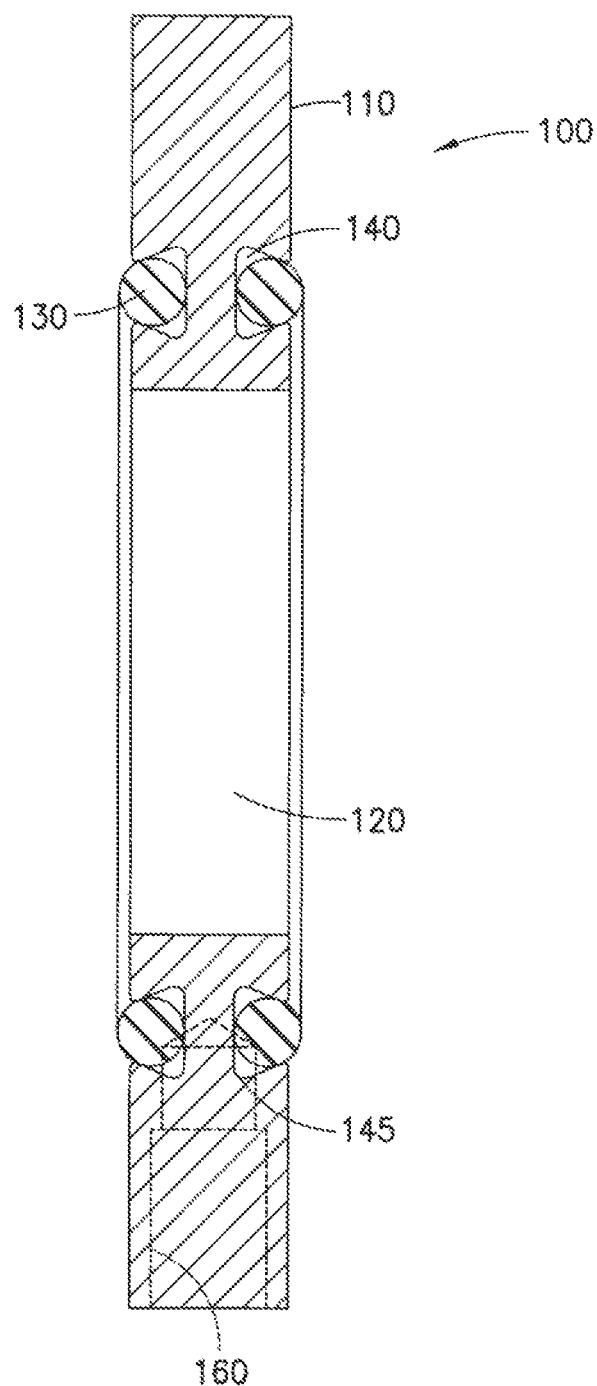
FIG. 4 is a cross-sectional view taken along line A-A in FIG. 3.

With reference to FIG. 3, a manifold joint seal 100, according to one embodiment, includes a retainer body 110 having an opening 120 extending therethrough. With further reference to FIG. 4, and with continuing reference to FIG. 3, manifold joint seal 100 further includes a plurality of sealing elements 130 retained within channels 140. Channels 140 are provided on opposing surfaces of retainer body 110 surrounding opening 120. Each channel 140 is adapted to removably retain one sealing element 130. Sealing elements 130 described herein may be rubber O-rings, or similar sealing devices capable of providing an air-tight seal between two adjoining surfaces. Various materials, such as natural or synthetic rubber, thermoplastic polymers, or other compliant materials, may be used for constructing sealing elements 130. Additionally, sealing elements 130 may include various shapes, such as rectangular, triangular, or other polygonal shapes. The cross-section of sealing elements 130 is desirably circular. However, other cross-sectional shapes, such as rectangular or triangular are also possible. As shown in FIG. 4, each channel 140 includes a tapered opening 145 that narrows in the direction from the inside of retainer body 110 to the outside of retainer body 110. Each tapered opening 145 is adapted to securely hold sealing elements 130 and prevent dislocation of sealing elements 130 during installation of manifold joint seal 100.

With continuing reference to FIG. 3, retainer body 110 includes chamfered sections 150 provided on one or more edges formed between two adjoining surfaces of retainer body 110. Chamfered sections 150 are provided for easier installation of manifold joint seal 100 inside an opening provided in the manifold. Retainer body 110 is desirably machined from a metallic material, such as steel or aluminum. Optionally, retainer body 110 may be manufactured from a non-metallic material, such as a polymeric material, provided that such material is dimensionally stable from deforming under high air pressures. Further illustrated in FIG. 3 is a plurality of apertures 160 for securing manifold joint seal 100 to a manifold.

Figure 5:
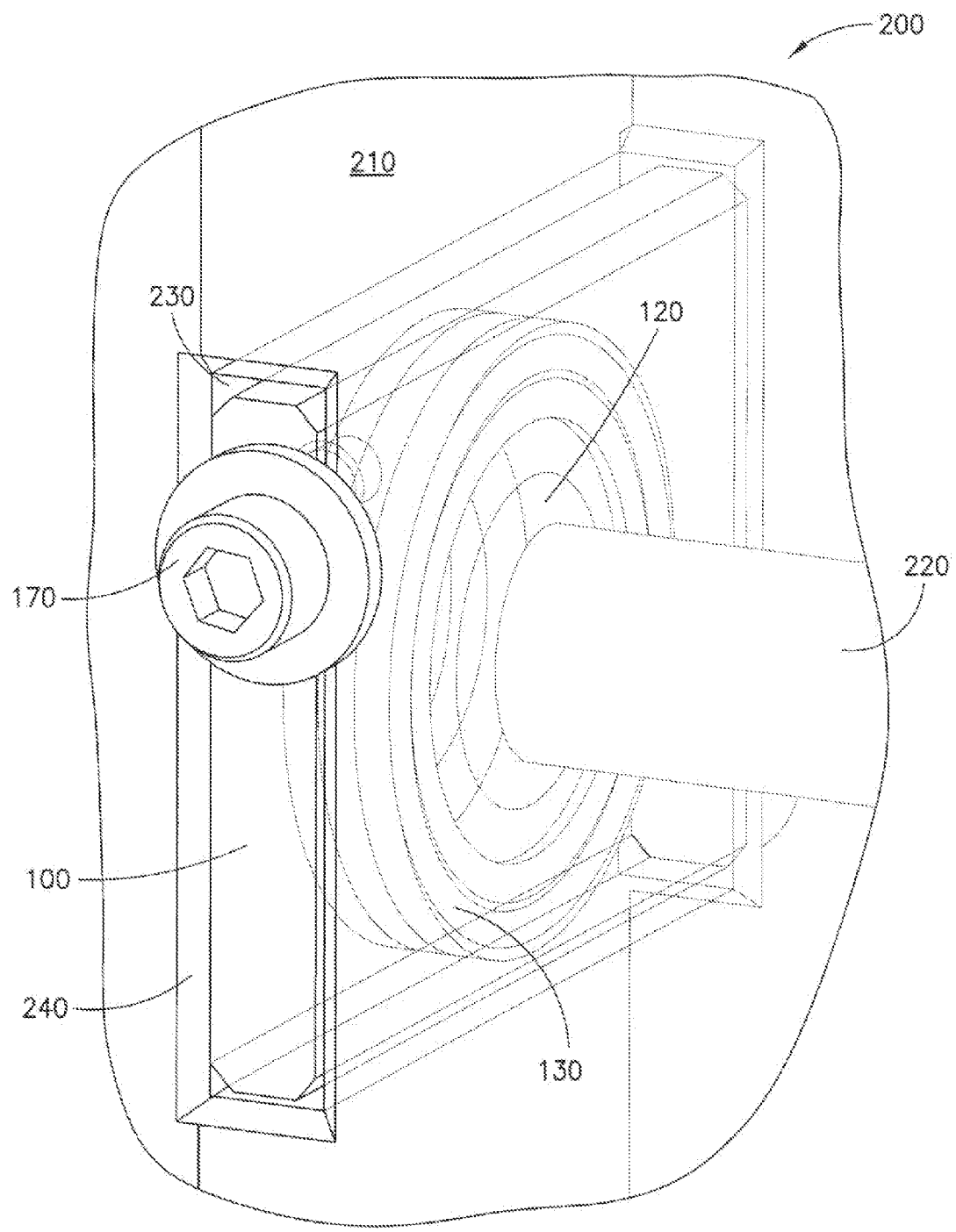
FIG. 5 is a perspective view of the manifold joint seal of FIG. 3 shown installed on a manifold.
Figure 6:
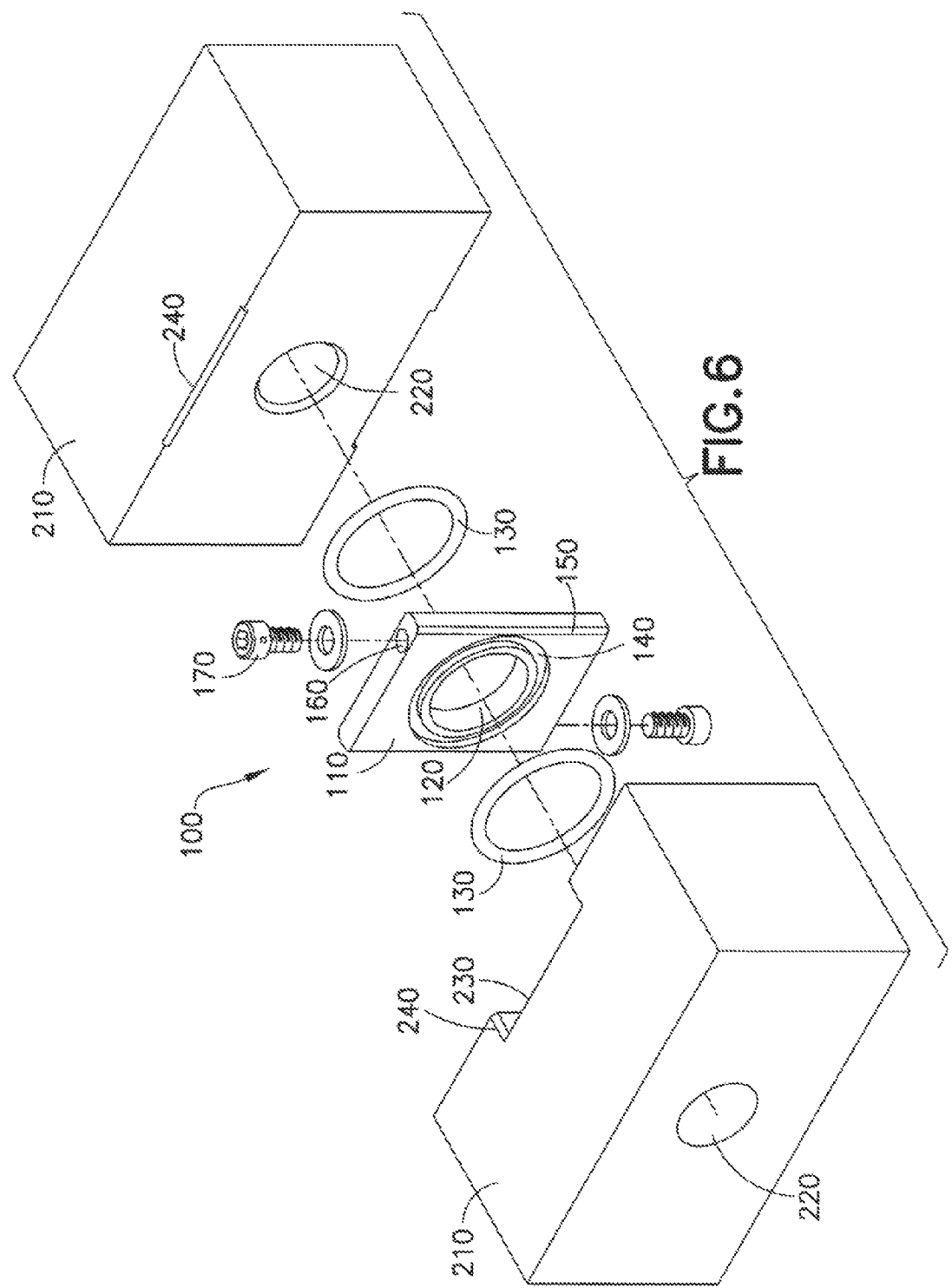
FIG. 6 is an exploded perspective view of the assembly shown in FIG. 5.

With further reference to FIGS. 5 and 6, manifold joint seal 100 is shown installed on a manifold 200. Manifold 200 includes a plurality of manifold sections 210 connected at the adjoining surfaces. Each manifold section 210 includes one or more passageways 220. A plurality of pneumatic devices (not shown), such as valves, solenoids, brake lines, and pneumatic couplings may be mounted on manifold 200. Passageways 220 provide fluid connection between manifold 200 and one or more pneumatic devices.

With continuing reference to FIGS. 5 and 6, manifold joint seal 100 is inserted into a slot 230 provided in one of the manifold sections 210 of manifold 200. Slot 230 is dimensioned such that manifold joint seal 100 may be inserted therein. Slot 230 may be provided on one or both of the adjoining manifold sections 210. Additionally, slot 230 may extend through the entire width, or part thereof, of each manifold section 210. Slot 230 and passageways 220 include chamfered edges 240 which allow sealing elements 130 to be inserted into slot 230 without being damaged on sharp edges of slot 230. Similarly, the chamfered sections 150 of manifold joint seal 100 also reduce the possibility of damaging sealing elements 130 during insertion of manifold joint seal 100 into slot 230. Desirably, slot 230 is formed by machining.

Once inserted into slot 230, opening 120 of retainer body 110 desirably aligns with one or more passageways 220 of manifold 200. By aligning the opening 120 with one or more passageways 220, compressed air may pass between manifold sections 210. Manifold joint seal 100 is disposed inside slot 230 such that one sealing element 130 closely abuts the surface surrounding passageway 220 on one manifold section 210 while the second sealing element 130 abuts the surface surrounding passageway 220 on the adjoining manifold section 210. Sealing elements 130 create a substantially air-tight connection between manifold sections 210 without restricting the air flow therethrough.

With continuing reference to FIG. 5, manifold joint seal 100 is secured to manifold 200 by way of one or more fasteners such as bolts 170. Each bolt 170 is adapted to reversibly engage aperture 160. In the embodiment illustrated in FIG. 5, slot 230 extends through the entire width of manifold sections 210. Because apertures 160 are located on opposing sides of retaining body 110, manifold joint seal 100 may be inserted inside slot 230 such that each aperture 160 is exposed on an opposing side of manifold 200. Manifold joint seal 100 is secured inside slot 230 by tightening bolts 170 inside each aperture 160.

Figure 7:
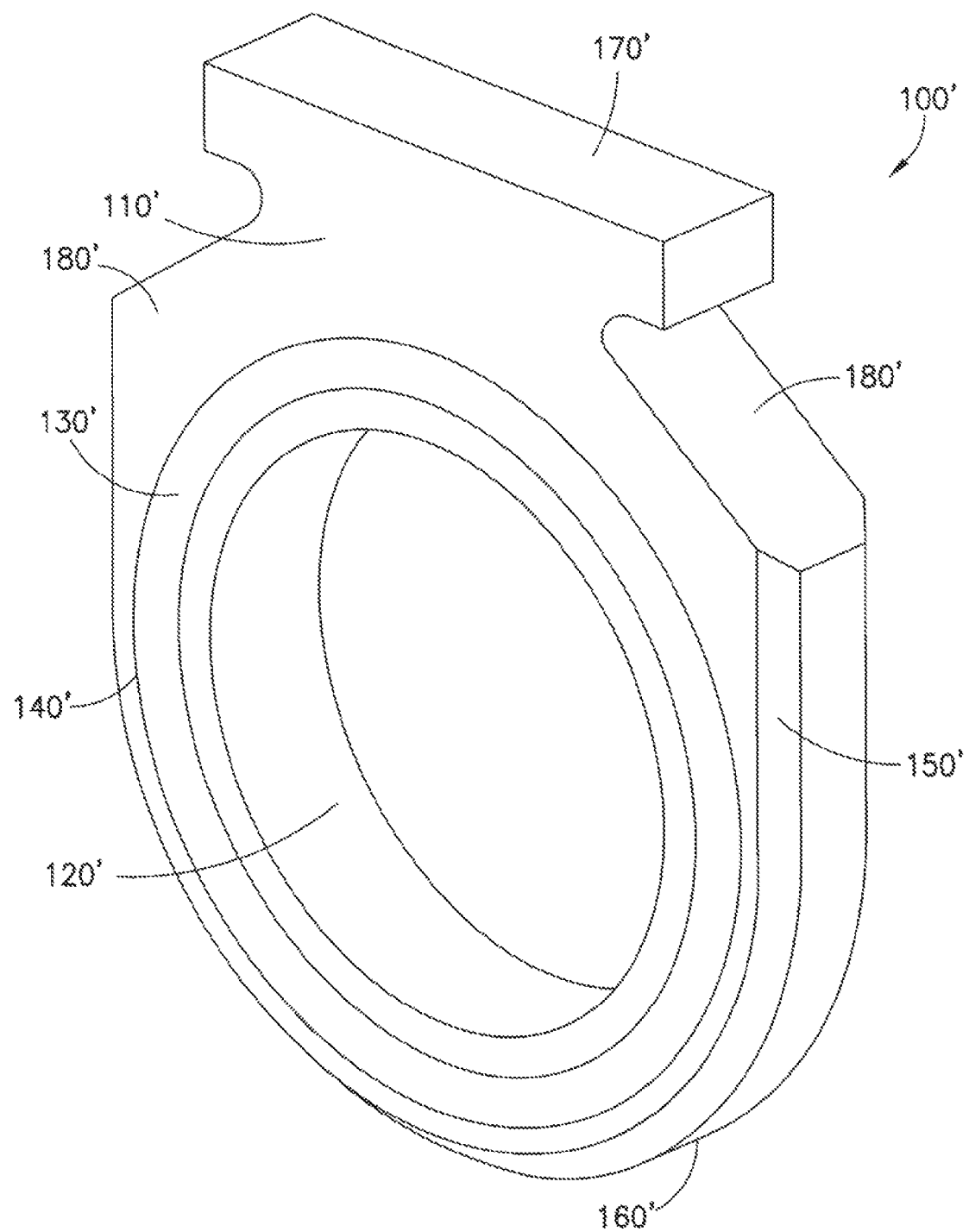
FIG. 7 is a perspective view of another embodiment of the manifold joint seal.

With reference to FIG. 7, a manifold joint seal 100' is shown in accordance with another embodiment. Manifold joint seal 100' includes a retainer body 110' having an opening 120' extending therethrough. Manifold joint seal 100' further includes a plurality of sealing elements 130' contained within channels 140'. Each channel 140' is adapted to removably retain one sealing element 130' and desirably includes a tapered opening similar to tapered opening 45 shown in FIG. 4. Retainer body 110' includes chamfered sections 150' provided on one or more edges between two adjoining surfaces of retainer body 110'. Chamfered sections 150' are provided for easier installation of manifold joint seal 100'.

Figure 8:
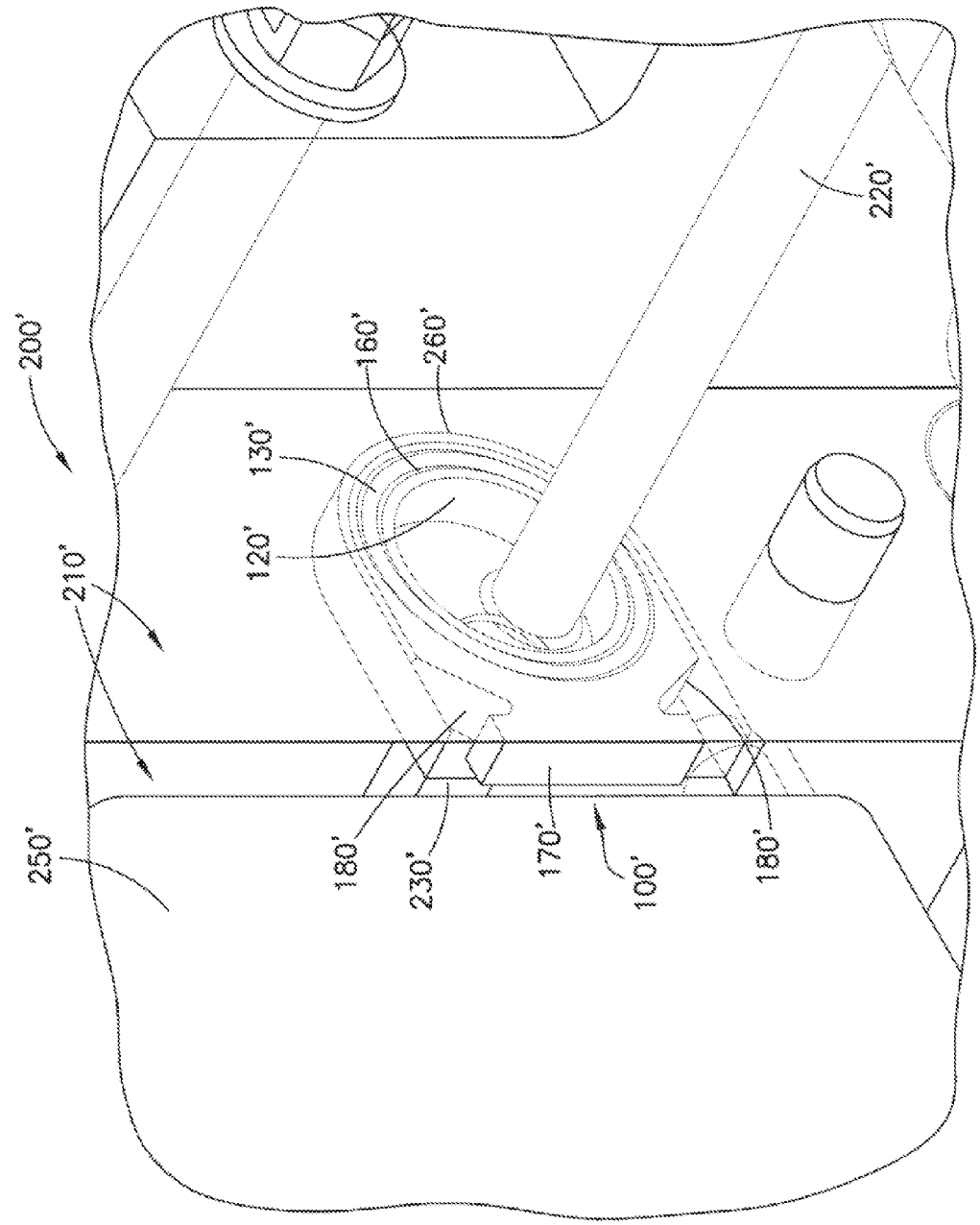
FIG. 8 is a perspective view of the manifold joint seal of FIG. 7 shown installed on a manifold.

With continuing reference to FIG. 7, retainer body 110' has an arcuate or curved portion 160' opposite a flat portion 170'. One or more recessed sections 180' are provided adjacent flat portion 170'. With reference to FIG. 8, manifold joint seal 100' is shown installed on manifold 200'. In this embodiment, a slot 230' is formed on one manifold section 210' and extends only partly therethrough. It is to be understood that slot 230' may be provided on both manifold sections 210'. Slot 230' is desirably dimensioned such that manifold joint seal 100' is slidingly received therein. In the embodiment shown in FIG. 8, slot 230' has an arcuate part 260' that corresponds to arcuate portion 160' of manifold joint seal 100'. Flat portion 170' is desirably aligned with the exterior surface of manifold sections 210' when manifold joint seal 100' is fully inserted into slot 230'.

Once inserted into slot 230', opening 120' of retainer body 110' aligns with one or more passageways 220' of manifold 200'. The alignment of the opening 120' with one or more passageways 220' allows the air to pass between manifold sections 210'. Manifold joint seal 100' is disposed inside slot 230' such that one sealing element 130' closely abuts the surface surrounding passageway 220' on one manifold section 210' while the second sealing element 130' abuts the surface surrounding passageway 220' on the adjoining manifold section 210'. Sealing elements 130' create an air-tight connection between manifold sections 210' without restricting airflow therethrough. Manifold joint seal 100' is secured to manifold 200' by a fixing plate 250' which may be bolted to manifold 200. Manifold joint seal 100' may be extracted from slot 230' by means of an extraction tool (not shown) that engages the recessed elements 180'.

With the basic structure of manifold joint seal 100 now described, a method of installation of manifold joint seal 100 onto a manifold 200 will now be described with reference to FIG. 9. In various embodiments, manifold joint seal 100 is utilized to provide an air-tight connection between one or more passageways 220 of manifold 200. In the described embodiments, slot 230 is provided on only one manifold section 210; however, it is to be understood that this described embodiment is exemplary only, and that the slot 230 may be provided on the other manifold section 210 or both manifold sections 210. Additionally, slot 230 may extend along the entire width, or part thereof, of each manifold section 210.

According to an embodiment of the present invention illustrated in FIG. 9, a method of installing manifold joint seal 100 begins at step 400 where a first manifold section 210 is provided. At step 410, a second manifold section 210 is provided. Beginning at step 420, slot 230 is provided on one or more manifold sections 210. At step 430, manifold joint seal 100 is inserted into slot 230 such that opening 120 of retainer body 110 is aligned with passageway 220 inside manifold 200. Sealing elements 130 create an air-tight fluid connection between the adjoining manifold sections 210. At step 440, manifold joint seal 100 is secured to manifold 200. For example, manifold joint seal 100 may be secured to manifold 200 using one or more bolts 170 engaged with apertures 160 provided on opposite sides of retainer body 110. Manifold joint seal 100 may be removed from manifold 200 by releasing bolts 170 from apertures 160 and removing manifold joint seal 100 from slot 230. Manifold joint seal 100 may be serviced by replacing sealing elements 130 and re-installing manifold joint seal 100 inside slot 230 of manifold 200.

While the device and method of the present invention have been described with respect to preferred embodiments, various modifications and alterations may be made without departing from the spirit and scope of the present invention. Although a pneumatic manifold for a railway vehicle has been used by way of an example, pneumatic manifolds for various other types of vehicles utilizing pneumatic brakes are equally applicable to the described embodiments of manifold joint seal 100. The scope of the present invention is defined in the appended claims and equivalents thereto.

The invention claimed is:

1. A manifold for a braking system of a railway vehicle, the manifold comprising:
    a first manifold section having a first surface thereon and a plurality of fluid passageways extending therethrough;
    a second manifold section having a second surface and a plurality of fluid passageways extending therethrough, the first surface of the first manifold in alignment with the second surface of the second manifold such that the plurality of fluid passageways of the first manifold section are in fluid connection with the plurality of fluid passageways of the second manifold section;
    a vertical slot formed in at least one of the first manifold section and the second manifold section, the vertical slot extending through a width of at least one of the first manifold section and the second manifold section; and
    a manifold joint seal operative for creating a seal between the first surface of the first manifold section and the second surface of the second manifold section such that a substantially air-tight fluid connection is created between the fluid passageways,
    wherein the manifold joint seal comprises a retaining body removably seated within the vertical slot, the retaining body comprising an opening extending through the retaining body such that fluid can pass between the first manifold section and the second manifold section through the opening, the manifold joint seal being removable from a top and a bottom of the vertical slot while the first manifold section and the second manifold section remain connected.

2. The manifold according to claim 1, wherein the manifold joint seal has at least one chamfered section on the exterior surface thereof.

3. The manifold according to claim 1, wherein the retaining body comprises opposed top and bottom apertures accepting removable fasteners engaging the first manifold section and the second manifold section from above and below to removably seat the retaining body in the vertical slot.

4. The manifold according to claim 1, wherein the manifold joint seal comprises sealing elements contacting the first surface of the first manifold section and second surface of the second manifold section such that the sealing elements create the substantially air-tight fluid connection between the fluid passageways.

5. The manifold according to claim 4, wherein the sealing elements are at least partially contained inside respective channels provided on opposing surfaces surrounding the opening on the retaining body.

6. A manifold joint seal for a railway vehicle, comprising:
    a retaining body having an opening extending through the retaining body;
    at least one sealing element; and
    at least one channel surrounding the opening in the retaining body for retaining the sealing element therein,
    wherein the retaining body is adapted to be removably seated within a vertical slot defined in at least one of a first manifold section and a second manifold section to extend therethrough, such that the at least one sealing element creates a substantially air-tight fluid connection between fluid passageways extending through the first manifold section and the second manifold section, and
    wherein the opening in the retaining body is positioned such that fluid can pass between the first manifold section and the second manifold, and the manifold joint seal being removable from a top and a bottom of the vertical slot while the first manifold section and the second manifold section remain connected.

7. The manifold joint seal according to claim 6, wherein the at least one channel narrows in an axial direction from the inside of the retainer body to the outside of the retainer body.

8. The manifold joint seal according to claim 6, wherein the retaining body comprises opposed top and bottom apertures accepting removable fasteners engaging the first manifold section and the second manifold section from above and below to removably seat the retaining body in the vertical slot.

9. A method of forming a manifold for a braking system of a railway vehicle, the method comprising the steps of:
providing a first manifold section having a first surface and a plurality of fluid passageways extending therethrough;
providing a second manifold section having a second surface and a plurality of fluid passageways extending therethrough, the first surface of the first manifold in alignment with the second surface of the second manifold such that the plurality of fluid passageways of the first manifold section are in fluid connection with the plurality of fluid passageways of the second manifold section;
wherein a vertical slot extends through at least one of the first manifold section and the second manifold section, the vertical slot extending through at least part of a width of at least one of the first manifold section and the second manifold section;
inserting a manifold joint seal into the vertical slot, the manifold joint seal comprising a retaining body removably seated within the vertical slot and creating a seal between the first surface of the first manifold section and the second surface of the second manifold section, such that a substantially air-tight fluid connection is created between the fluid passageways, wherein the retaining body comprises an opening extending through the retaining body such that fluid can pass between the first manifold section and the second manifold section through the opening, the manifold joint seal being removable from a top and a bottom of the vertical slot while the first manifold section and the second manifold section remain connected.

10. The method according to claim 9, wherein the manifold joint seal comprises sealing elements contacting the first surface of the first manifold section and the second surface of the second manifold section, such that the sealing elements create the substantially air-tight fluid connection between the fluid.

11. The method according to claim 10, wherein the sealing elements are at least partially contained inside respective channels provided on opposing surfaces surrounding the opening on the retaining body.

12. The method according to claim 9, wherein the manifold joint seal has at least one chamfered section on the exterior surface thereof.

13. The method according to claim 9, further comprising inserting removable fasteners into opposed top and bottom apertures in the retaining body so as to engage the first manifold section and the second manifold section from above and below to removably seat the retaining body in the vertical slot.

* * * * *